(12) United States Patent
Burrows et al.

(10) Patent No.: US 6,856,746 B2
(45) Date of Patent: *Feb. 15, 2005

(54) TITANIUM-INDIFFUSION WAVEGUIDES AND METHODS OF FABRICATION

(75) Inventors: Lee J. Burrows, Pasadena, CA (US); William B. Bridges, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/402,486

(22) Filed: Mar. 28, 2003

(65) Prior Publication Data

US 2003/0185533 A1 Oct. 2, 2003

Related U.S. Application Data

(63) Continuation of application No. 09/418,725, filed on Oct. 15, 1999, now Pat. No. 6,625,368.

(51) Int. Cl.[7] .............................................. G02B 6/10
(52) U.S. Cl. ...................... 385/132; 385/131; 385/129; 65/30.13
(58) Field of Search .......................... 385/14, 129, 130, 385/131, 132; 65/30.12, 30.1, 30.13

(56) References Cited

U.S. PATENT DOCUMENTS

| | | | |
|---|---|---|---|
| 3,791,714 A | * 2/1974 | Maurer | 385/142 |
| 4,196,963 A | 4/1980 | Chen et al. | 350/96.12 |
| 4,640,736 A | 2/1987 | Holman | 156/603 |
| 4,778,234 A | 10/1988 | Papuchon et al. | 350/96.12 |
| 5,064,684 A | 11/1991 | Mir et al. | 427/53.1 |

(List continued on next page.)

FOREIGN PATENT DOCUMENTS

| | | | |
|---|---|---|---|
| EP | 0 635 735 | 6/1994 | G02B/6/12 |
| EP | 0 652 457 | 9/1994 | G02F/1/035 |
| WO | WO 99/63393 | 12/1999 | |

OTHER PUBLICATIONS

Nozawa, T. et al., "Water Vapor Effects on Titanium Diffusion into LiNbO3 Substrates" Japanese Journal of Applied Physics, vol. 29, No. 10, pp. 2180–2185, Oct. 1, 1990.

Kwiatkowski, et al., "Nearly cut–off modes caused by diffusion in lithium niobate", Journal of Applied Physics, vol. 76, No. 10, pt. 1, pp. 5877–5885, Nov. 15, 1994.

Negata, et al., "Reduced thermal decomposition of OH–free LiNbO3 substrates even in a dry gas atmosphere", Journal of Materials Research, Aug. 1996, Mater. Res. Soc., USA, vol. 11, No. 8, pp. 2085–2091.

*Primary Examiner*—Rodney Bovernick
*Assistant Examiner*—Sung Pak
(74) *Attorney, Agent, or Firm*—Thelen Reid & Priest, LLP; David B. Ritchie (57) ABSTRACT

A method for fabricating titanium-indiffusion waveguides in optical modulators and other optical waveguide devices includes disposing titanium, strips in a waveguide pattern on the surface of a crystalline substrate, such as lithium niobate or lithium tantalate, and indiffusing the titanium atoms into the crystalline substrate by creating a flowing, wet deuterium oxide ($D_2O$) environment, raising the temperature in the $D_2O$ environment to a temperature within the range of 900 degrees Celsius and 1100 degrees Celsius and maintaining the temperature for a period of time that will allow for the necessary indiffusion of titanium to occur within the crystal substrate. The Ti-indiffusion waveguides that result from performing the Ti-indiffusion process in a flowing, wet $D_2O$ environment include crystalline substrates, such as lithium niobate or lithium tantalate, titanium strips disposed in a waveguide pattern on the crystalline substrate and a diffusion region resulting from high temperature processing in a flowing, wet $D_2O$ environment.

15 Claims, 5 Drawing Sheets

U.S. PATENT DOCUMENTS

| | | | |
|---|---|---|---|
| 5,095,518 A | 3/1992 | Young et al. | 385/130 |
| 5,193,136 A | 3/1993 | Chang et al. | 385/129 |
| 5,267,336 A | 11/1993 | Sriram et al. | 385/2 |
| 5,473,722 A | 12/1995 | Sohler et al. | 385/132 |
| 5,478,371 A | 12/1995 | Lemaire et al. | 65/384 |
| 5,985,022 A | 11/1999 | Fukuda et al. | 117/11 |
| 6,091,879 A | 7/2000 | Chan et al. | 385/143 |
| 6,567,598 B1 * | 5/2003 | Burrows | 385/129 |

* cited by examiner

TITANIUM-INDIFFUSION WAVEGUIDES AND METHODS OF FABRICATION

CROSS-REFERENCE TO RELATED APPLICATIONS

This application is a continuation of application Ser. No. 09/418,725, filed on Oct. 15, 1999 now U.S. Pat No. 6,625,368, in the name of inventors Lee J. Burrows and William B. Bridges, entitled "Titanium-Indiffusion Waveguides and Method of Fabrication", now U.S. Pat. No. 6,625,368 B1, issued Sep. 23, 2003. This application is also related to: U.S. patent application Ser. No. 09/157,652 filed Sep. 21, 1998 in the name of inventor Lee J. Burrows, entitled "Articles Useful As Optical Waveguides and Method for Manufacturing Same"; U.S. patent application Ser. No. 09/309,361 filed May 11, 1999, in the name of inventor Lee J. Burrows, entitled "Method for Pressurized Annealing of Lithium Niobate and Resulting Lithium Niobate Structures"; U.S. patent application Ser. No. 09/419,347 filed on Oct. 15, 1999, in the name of inventor Lee J. Burrows, entitled "Ion Exchange Waveguides and Methods of Fabrication", and U.S. patent application Ser. No. 09/419,349 filed on Oct. 15, 1999 in the name of inventor Lee J. Burrows, entitled "Titanium-Indiffusion Waveguides", now U.S. Pat. No. 6,567,598 B1, issued May 20, 2003, all commonly assigned.

STATES AS TO RIGHTS TO INVENTIONS

The United States Government has certain rights in this invention pursuant to Grant No. F-19628-95-C-0002 awarded by the United States Air Force.

BACKGROUND OF INVENTION

1. Field of the Invention

The present invention relates to a method for fabricating titanium indiffusion (Ti-indiffusion) waveguides in optical modulators using a deuterium oxide ($D_2O$) diffusion process and the resulting waveguides and modulators. More particularly, the present invention relates to a method for fabricating lithium niobate or lithium tantalate modulators by bubbling oxygen ($O_2$) through deuterium oxide to create a wet environment for the Ti-indiffusion process.

2. Background

Optoelectronic components can be fabricated on several types of substrates including polymers, glass, semiconductors (e.g., gallium arsenide (GaAs) and indium phosphide (InP)) and inorganic materials (e.g., lithium niobate ($LiNbO_3$) and lithium tantalate ($LiTaO_3$)). Characteristically, an electro-optic material is one in which the index of refraction changes with the application of an electric field. One of the most important components in optoelectronic systems is the modulator. Three competing technologies in this realm are: direct modulation of a semiconductor laser, semiconductor electro-absorption modulators, and the lithium niobate modulator. Currently, lithium niobate modulators are the modulation devices of choice for many systems because they yield high performance, are a relatively mature technology and other modulation schemes impose limits not faced with lithium niobate modulators.

Lithium niobate has proven to be a suitable medium for components such as amplitude modulators, phase modulators, optical switches, polarization transformers, tunable filters and wavelength-selective optical add/drop filters. Lithium niobate has also been used as the host for solid state lasers using rare earth ions, e.g., erbium. Most current telecommunication and cable television system applications for $LiNbO_3$ modulators involve discrete components for the optical transmitter subsystem. This configuration couples continuous wave lasers, typically diode-pumped YAG or erbium fiber oscillators, with lithium niobate external modulators and various wavelength and power stabilization components.

Lithium niobate is a popular nonlinear optical crystal for several reasons including its large electro-optic coefficients, the ease with which high quality optical waveguides are fabricated and its amenability to conventional integrated circuit processing techniques. High quality optical waveguides are those that possess low loss and relatively high power handling capabilities. Additionally, $LiNbO_3$ is a hard material, thus it is easily polished for optical fiber coupling which makes its use in optical network systems relatively uncomplicated. It is also a relatively inexpensive crystal, due in part to its long history of use in surface-acoustic-wave (SAW) filters for radio frequencies. By comparison, lithium tantalate $LiTaO_3$ is essentially interchangeable with lithium niobate as far as modulator characteristics are concerned, but the use of $LiTaO_3$ is often cost prohibitive because it is not as widely commercially used as $LiNbO_3$. Additionally, other optical crystalline structures having the formula $RMO_3$, where R is an alkaline earth metal, M is a Group IVB or Group VB metal, and O is oxygen can conceivably be used in the fabrication of waveguides and modulators.

For example, one type of modulator incorporating the use of $LiNbO_3$ is a Mach-Zehnder modulator. In a Mach-Zehnder modulator an incoming optical beam is split equally at a Y junction into two parallel waveguides, which then recombine at another Y junction after some distance. Electrodes are used to apply an electric field in the region of the optical waveguides. The electric field causes a relative phase shift between the two branches. If the phase shift in both arms is the same, then the two optical signals will recombine constructively at the second Y branch and no optical power will be lost. If there is a phase difference between the two arms, then there will be destructive interference and some optical power will be lost. The resulting destructive and constructive interference causes the output optical intensity to vary between a minimum and a maximum value.

In other electro-optic applications optical waveguide directional couplers can also be used as electro-optic modulators. In this type of modulator two waveguides are placed on the lithium niobate substrate in very close proximity to one another. The wave from one guide can "leak" into the other guide. By applying an electric field to the lithium niobate, the amount of "leakage" can be controlled, thus modulating the transfer of power from one guide to the other. Currently, different commercial application requirements favor either directional couplers or Mach-Zehnder modulators.

The advantage of high-speed, large bandwidth, digital or analog communications has led to a demand for the external modulator configuration. The most common approach utilizes a low-noise, high power diode-pumped laser whose signal is sent to the $LiNbO_3$ modulator via optical fiber. The modulator applies either analog or digital information to the optical carrier.

When using lithium niobate in the fabrication of optical waveguides and optical modulators it is desired to avoid having a niobium-rich, lithium-poor and/or oxygen poor composition. When bulk lithium niobate has such niobium rich-compositions, and is then processed at high temperatures (T>300 degrees Celsius), growth of the $LiNb_3O_8$ phase in the crystal may occur. This phase is undesirable because it is not optically transparent and leads to high losses in optical waveguides and optical modulators.

Such niobium-rich compositions can occur in two different manners during fabrication of optical waveguides and optical modulators. First, typical ion exchange procedures result in the replacement of lithium atoms in the crystal lattice with a diffusion ion leading to a lithium niobate composition relatively rich in niobium. Second, standard high temperature (temperatures in excess of 300 degrees Celsius) processing of lithium niobate can cause $Li_2O$ out-diffusion, and result in niobium-rich, and lithium and oxygen poor compositions.

Ti-indiffusion waveguides are one of the more commonly used optical waveguides currently in existence. The Ti-indiffusion process drives titanium atoms into the crystal structure lattice causing titanium atoms to either disperse interstitially in the lattice or replace niobium atoms. This process results in one or more refractive indices (e.g., the extraordinary and ordinary refractive indices) of the crystal substrate being altered in the region where the titanium indiffusion occurs to create an optical waveguide.

Ti-indiffusion implements high temperature processing (temperatures in the range of 900 to 1100 degrees Celsius). To eliminate the undesired $LiNb_3O_8$ phase from forming in the crystal during Ti-indiffusion processing it is usually performed in a wet atmosphere of inert carrier gas, such as nitrogen ($N_2$) or argon ($Ar_2$), or in a wet atmosphere of oxygen ($O_2$). This type of indiffusion process involves bubbling the inert carrier gas or oxygen gas through water ($H_2O$). The wet atmosphere has been considered beneficial in the past because the $H_2O$ breaks down into $H^+$ and $OH^-$ ions which chemically attack the $LiNb_3O_8$ phase, and break it back down into $LiNbO_3$. The present inventors have discovered that a drawback of this type of high temperature processing is that the $H_2O$ gives off undesirable protons ($H^+$) which are attracted by the lithium niobate and result in an inadvertent proton-exchanged surface layer occurring. These protons remain in the modulators after fabrication and flow relatively freely among the waveguides, the electrodes, the lithium niobate crystal and the buffer layer interface. It is now understood that these free flowing protons can and do adversely affect a modulator's DC-bias stability because they act as charge carriers and are driven by the applied electric fields, causing the response of the final product to drift over time when a bias is applied.

It would therefore be highly advantageous to devise a fabrication method for Ti-indiffusion waveguides that uses an improved flowing, wet atmosphere Ti-indiffusion process that does not introduce significant numbers of free flowing protons into the waveguide construct that adversely affect the waveguide/modulator's DC-bias stability.

BRIEF DESCRIPTION OF THE INVENTION

A method for fabricating titanium-indiffusion waveguides in optical modulators and other optical waveguide devices includes disposing titanium strips in a waveguide pattern on the surface of a crystalline substrate, such as lithium niobate or lithium tantalate, and indiffusing the titanium atoms into the crystalline substrate by creating a flowing, wet deuterium oxide ($D_2O$) environment, raising the temperature in the $D_2O$ environment to a temperature within the range of 900 degrees Celsius and 1100 degrees Celsius and maintaining the temperature for a period of time that will allow for the necessary indiffusion of titanium to occur within the crystal substrate. The Ti-indiffusion waveguides that result from performing the Ti-indiffusion process in a flowing, wet $D_2O$ environment include crystalline substrates, such as lithium niobate or lithium tantalate, titanium strips disposed in a waveguide pattern on the crystalline substrate and a diffusion region resulting from high temperature processing in a flowing, wet $D_2O$ environment.

DETAILED DESCRIPTION OF THE INVENTION

Those of ordinary skill in the art will realize that the following description of the present invention is illustrative only and is not intended to be in any way limiting. Other embodiments of the invention will readily suggest themselves to such skilled persons from an examination of the within disclosure.

In accordance with one embodiment of the present invention, a method is provided for fabricating a Ti-indiffusion optical waveguide in lithium niobate ($LiNbO_3$) optical modulators whereby the indiffusion environment is created by bubbling oxygen ($O_2$) through deuterium oxide ($D_2O$) to create flowing wet environment that is devoid of free protons. Ti-indiffusion optical waveguide fabrication involves altering one or more refractive indices (e.g., the extraordinary and ordinary refractive indices) of the crystal substrate in the region where the titanium indiffusion occurs to create an optical waveguide. The following exemplary description of the modulator fabrication process is intended to limit the introduction of undesirable free protons into the fabrication process. FIGS. 1A–1G are cross sectional views of a lithium niobate modulator shown after completion of selected steps in a wet, $D_2O$ environment Ti-indiffusion waveguide fabrication process.

The present invention may also be defined as a method for fabricating a Ti-indiffusion waveguide in a lithium tantalate ($LiTaO_3$) optical modulator. Lithium tantalate is closely related in terms of electro-optical properties to $LiNbO_3$ but is not currently widely used in commercial electro-optical modulator applications because to do so would be cost prohibitive. The same or similar indiffusion process as described below for $LiNbO_3$ would be employed in the Ti-indiffusion waveguides fabricated from a $LiTaO_3$ substrate. Additionally, the crystal substrate that is used to form the optical modulator may be formed from a crystalline structure having the formula $RMO_3$, where R is an alkaline earth metal, M is a Group IVB or Group VB metal, and O is oxygen.

Figure 1A:
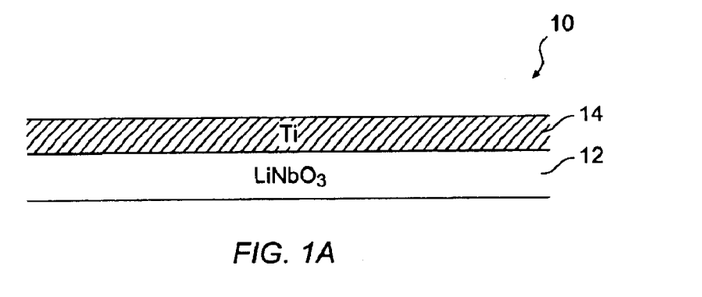
FIGS. 1A–1G are cross-sectional views of various stages in the fabrication of a Ti-indiffusion waveguide in a lithium niobate optical modulator that incorporates wet, flowing $D_2O$ atmosphere Ti-indiffusion in accordance with one embodiment of the present invention.

Referring to FIG. 1A, a modulator build 10 is shown after the formation of titanium (Ti) layer 14 over $LiNbO_3$ crystal substrate 12. Ti layer 14 may be formed over $LiNbO_3$ crystal substrate 12 by an electron beam evaporation process or another suitable deposition technique. The use of electron beam evaporation to deposit titanium over the surface of a crystal, such as $LiNbO_3$ crystal substrate 12, is well known by those of ordinary skill in the art. The thickness of Ti layer 14 may range from about 400 angstroms to about 1000 angstroms, and is preferably in a range of about 500 angstroms to about 600 angstroms for a single mode, Z-cut $LiNbO_3$ crystal having an operating optical wavelength of 1.3 microns.

Figure 1B:
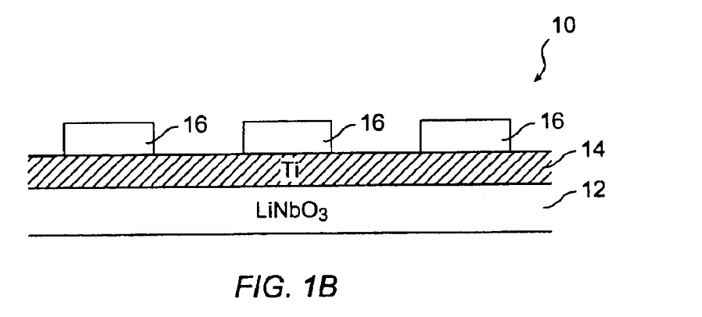

Shown in FIG. 1B is modulator build 10 after photo resist layer 16 is disposed in strip formation on the surface of Ti layer 14. A standard photolithography technique is used to place photo resist layer 16 over Ti layer 14. As shown in FIG. 1B, the photolithography process which employs the use of a waveguide template will result in the formation of strips of photo resist only in those areas where waveguides are to be fabricated. The use of such photolithography techniques are well known by those of ordinary skill in the art.

Figure 1C:
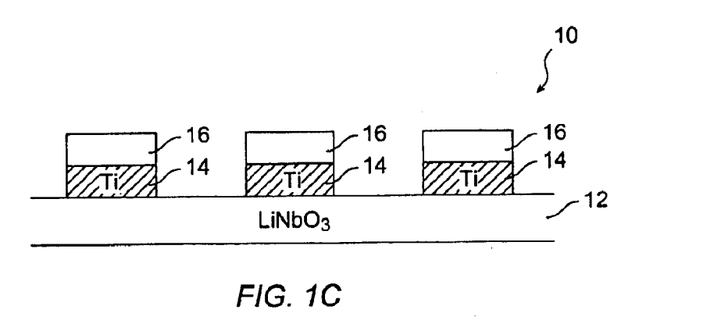

Referring to FIG. 1C, a conventional plasma etch or reactive ion etch (RE) technique is preferably used to etch away Ti layer 14 and expose $LiNbO_3$ crystal substrate 12 in those regions not masked by photo resist layer 16. A plasma etch or RIE procedure is chosen so that it selectively etches away the chosen photo resist material. It should be noted that the etch process should preferably not involve wet etching. Wet etching involves the use of acids and thus would generally be likely to introduce free protons into the waveguide structure that would adversely affect the $LiNbO_3$ (unless non-proton-based acids were used). As previously discussed, free protons in the waveguide tend to increase the likelihood of output voltage drift over time.

Figure 1D:
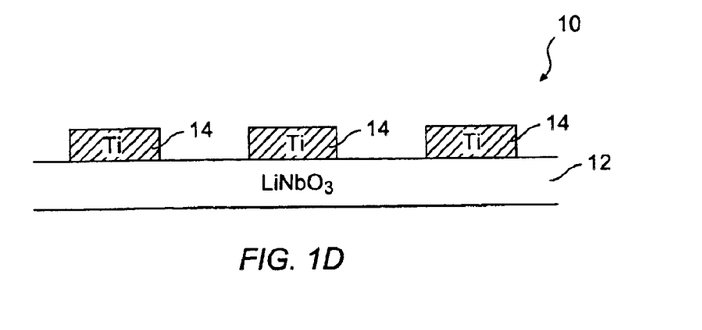

After the completion of the etch process, the photo resist material is stripped away by subjecting modulator build 10 to an oxygen plasma or by using an acetone wash procedure. As before, the use of acids for stripping purposes should preferably be avoided as they have a tendency to introduce free protons into the modulator structure and these free protons increase the likelihood of drift in the modulators. The resulting structure is shown in FIG. 1D with Ti layer 14 remaining only in the areas above $LiNbO_3$ crystal substrate 12 where waveguides are to be constructed. FIG. 1D is representative of modulator build 10 prior to the construct undergoing the flowing, wet $D_2O$ atmosphere Ti-indiffusion process of the present invention.

Figure 2A:
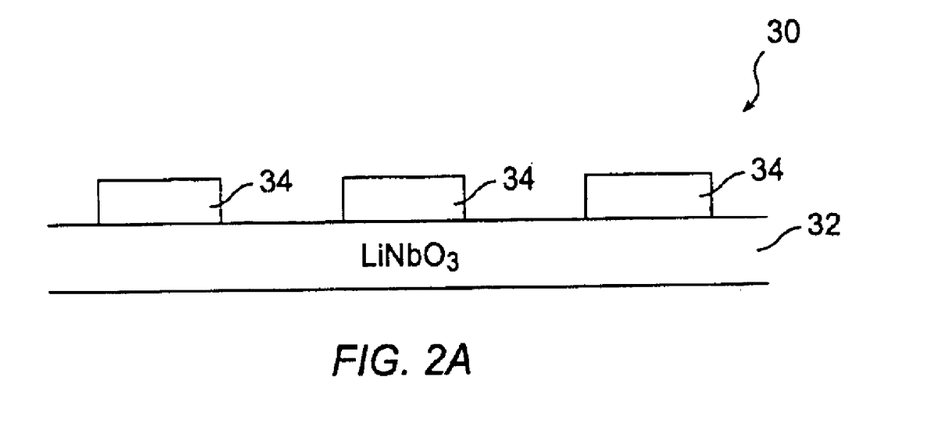
FIGS. 2A–2C are cross-sectional views of an alternative titanium deposition technique that may be used in the fabrication of a Ti-indiffusion waveguide in a lithium niobate optical modulator that incorporates wet, flowing $D_2O$ atmosphere Ti-indiffusion in accordance with one embodiment of the present-invention.
Figure 2B:
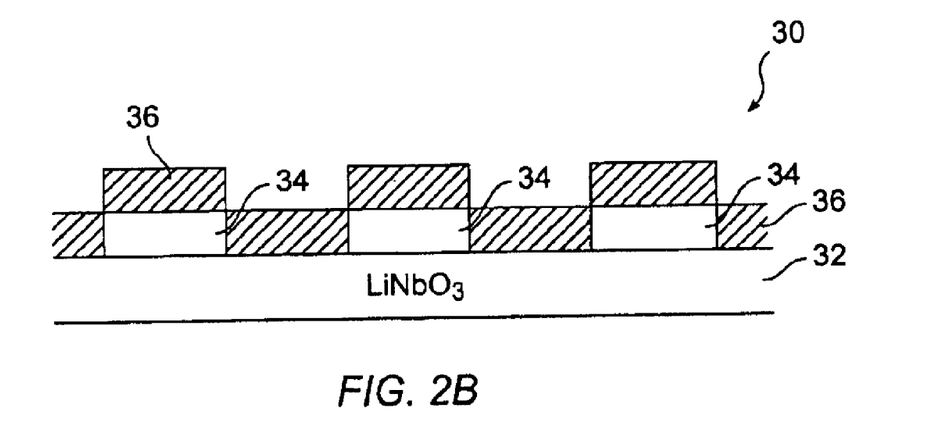
Figure 2C:
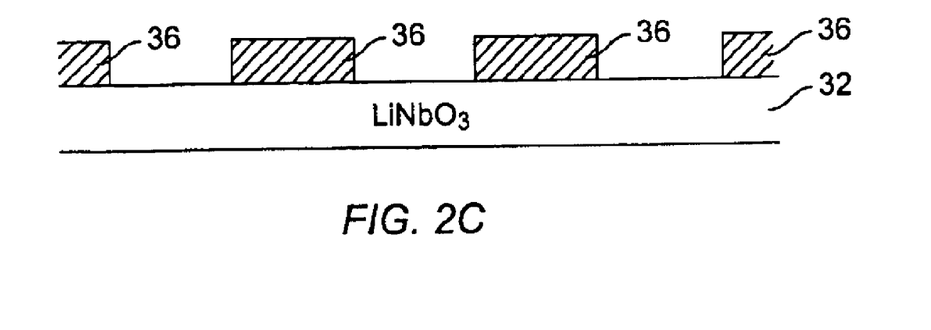

Shown in FIGS. 2A–2C is an alternate "lift off" method for forming titanium waveguide strips on lithium niobate (and similar) crystal structures in accordance with one embodiment of the present invention. FIG. 2A illustrates modulator build 30 having photo-resist layer 34 disposed above $LiNbO_3$ crystal substrate 32. A standard photolithography technique is used to place photo resist layer 34 over $LiNbO_3$ crystal substrate 32. As shown in FIG. 2A the photolithography process which employs the use of a reverse waveguide template will result in the formation of strips of photo resist layer 34 only in those areas where no waveguides will be fabricated. The use of such photolithography techniques is well known by those of ordinary skill in the art.

FIG. 2B shows modulator build 30 after Ti layer 36 has been disposed atop photo resist layer 34 and $LiNbO_3$ (or similar) crystal substrate 32. A standard electron deposition technique may be employed to deposit titanium on to modulator build 30. The thickness of Ti layer 36 may range from about 400 angstroms to about 1000 angstroms, and is preferably in a range of about 500 angstroms to about 600 angstroms for a single mode, Z-cut $LiNbO_3$ having an optical wavelength of 1.3 microns.

FIG. 2C depicts modulator build 30 after photo resist layer 34 has been "lifted is off" $LiNbO_3$ crystal substrate 32. The lift off process can be accomplished by subjecting modulator build 30 to an acetone or propenyl wash operation. The "lift off" process removes photo resist layer 34 and that portion of Ti layer 36 that is directly above photo resist layer 34. After the "lift off" process Ti layer 36 remains only in those regions where waveguides will be formed. FIG. 2C is representative of modulator build 30 prior to the construct undergoing the flowing, wet $D_2O$ atmosphere Ti-indiffusion process of the present invention.

Figure 3:
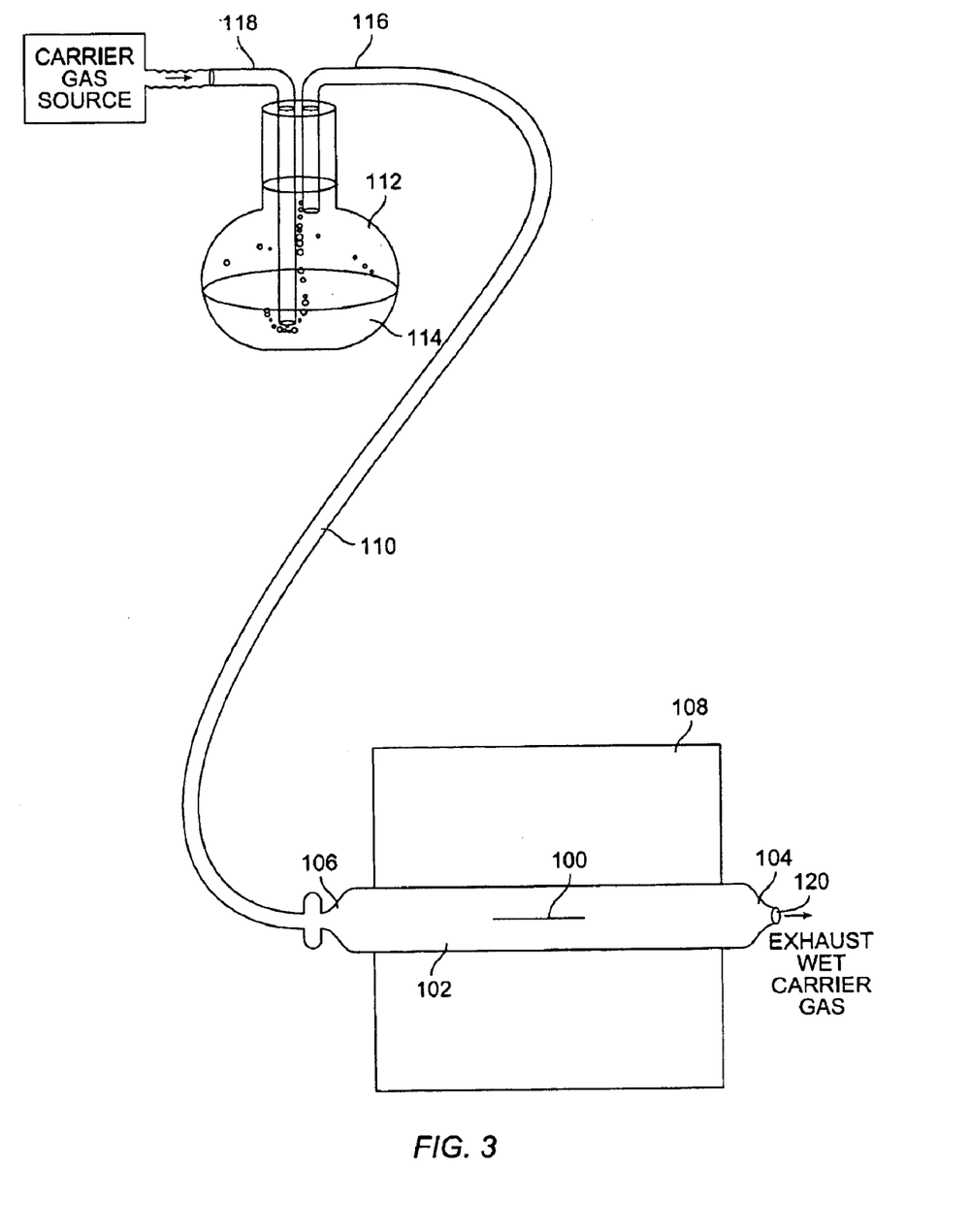
FIG. 3 is a cross-sectional view of a hardware set-up for Ti-indiffusion that incorporates a bubbling apparatus for creating a flowing, wet $D_2O$ atmosphere in accordance with one embodiment of the present invention.

The Ti-indiffusion process begins by placing a modulator build in a container that allows for the formation of a flowing, wet environment. By way of example, the container may be a tube-like structure constructed from a quartz material. FIG. 3 illustrates an example of an acceptable set-up for performing Ti-indiffusion in a flowing, wet environment created by bubbling $O_2$ gas through liquid $D_2O$. Modulator build 100 is placed in a quartz tube 102 having an open end 104 and an open end 106 that allow for the free flow of a wet atmosphere. Quartz tube 102 is placed in conventional commercial oven 108. Oven 108 serves as the indiffusion chamber and the use of such ovens is widely known by those of ordinary skill in the art. Open end 106 of quartz tube 102 is connected to a tube-like structure 110 that allows for the free flow of a wet atmosphere between the bubbling apparatus 112 and the quartz tube 102. The bubbling apparatus 112, illustrated as a glass beaker, confines the solution to be bubbled that will form the wet atmosphere inside quartz tube 102. In accordance with the present invention, bubbling apparatus 112 will hold the preferred wet atmosphere component, deuterium oxide 114 ($D_2O$). Liquid deuterium oxide can be obtained in pure concentration from the Alfa Aesar Corporation of Ward Hill, Mass. and other vendors. The bubbling apparatus 112 has an outlet 116 connected to tube-like structure 110 and an inlet 118 that allows for the carrier gas, such as oxygen, nitrogen, argon, helium, neon or another gas essentially non-reactive with the titanium and the substrate, to flow into the bubbling apparatus 112. Tube 102 preferably includes an outlet 120 to allow spent carrier gas to be exhausted so that it may be replaced by fresh $D_2O$-charged carrier gas. The use of such bubbling devices is well known by those of ordinary skill in the art and other bubbling device configurations may be used that will result in a flowing, wet $D_2O$ environment inside quartz tube 102.

The use of $D_2O$ as the component that creates the wet atmosphere is preferred over prior art processes that involve $H_2O$. In prior art Ti-indiffusion optical waveguide fabrication, $H_2O$ is preferred because it serves to attack the undesirable $LiNB_3O_8$ phase and breaks it down into $LiNbO_3$. As previously discussed, growth of the $LiNB_3O_8$ phase can occur when $LiNbO_3$ is processed at temperatures exceeding 300 degrees Celsius. The $LiNB_3O$ phase is undesirable because it tends to not be optically transparent and it leads to high losses in optical waveguides. However, processing in a wet atmosphere created from $H_2O$ has the high-risk potential for creating a proton exchanged surface layer on the waveguide build. These protons remain in the sample after processing and can adversely affect a modulator's DC-bias stability either through mobility in the crystal substrate surface layer, or along the crystal substrate/buffer layer interface.

The deuterium atom has an additional neutron in the presence of a hydrogen atom, and has a mass approximately twice that of a normal hydrogen atom. Since the deuterium is a heavier atom, it possesses a higher activation energy and, therefore, is less likely to move out of the binding site than would be a lighter proton. Additionally, the deuterium atoms are closer in size to the lithium atoms than protons. Protons which differ in size from the replaced lithium atoms, have a tendency to be more mobile in the crystal lattice. As a result of this mobility, the optical waveguides and the refractive index tend to drift over time, which alters the output intensity of the waveguide. However, when deuterium ions diffuse into the lithium niobate crystal structure and replace lithium atoms they tend to "lock down" in the crystal lattice and provide for more overall stability in the lattice. By implanting deuteron ions instead of protons during the Ti-indiffusion process, a decrease in the DC-bias stability of about $\sqrt{2}$ should be realized. This decrease is evident because bias drift is perceived to be dependant on ion diffusion proportional to the square root of the ionic mass. Additionally, $D_2O$ provides the same benefit as $H_2O$ in that it serves to chemically attack the undesirable $LiNB_3O_8$ phase and break it down into $LiNbO_3$. It should be noted that tritium (T or $^3H$) may also be advantageously used instead of deuterium (D or $^2H$) and should be considered an equivalent. Due to military restrictions, however, tritium is not presently widely commercially available in significant quantities.

Figure 4:
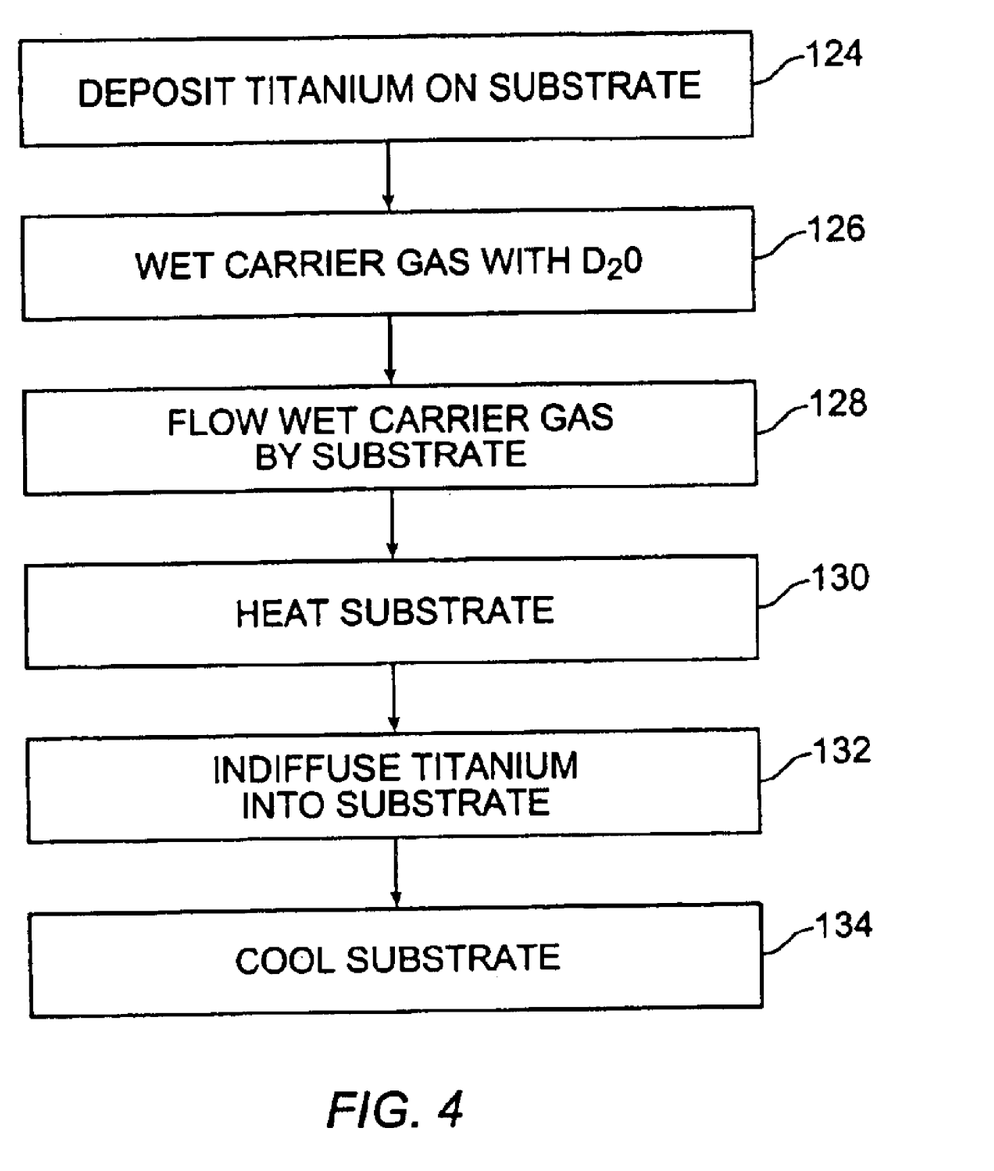
FIG. 4 is a process flow diagram for a process of fabricating titanium-indiffused substrates in accordance with a presently preferred embodiment of the present invention.

Turning now to FIG. 4, a presently preferred method for fabricating titanium-indiffused substrates in accordance with the present invention is illustrated. Deposition of the titanium on the substrate discussed above occurs at block 124. At block 126 the carrier gas is wet with $D_2O$ as discussed above.

The Ti-indiffusion process may commence once the modulator build is properly positioned in the indiffusion chamber; either within a quartz tube-structure (as shown in FIG. 3) or directly in the indiffusion chamber. The flowing, wet atmosphere is created within the quartz tube structure or directly in the indiffusion chamber by initiating the flow of the carrier gas through the bubbling apparatus (FIG. 4, reference number 128). The flow rate of the carrier gas may preferably be within the range of about 0.2 SCHF (Standard Cubic Feet per Hour) to about 5.0 SCHF with about 1.2 SCHF presently preferred. Once the flowing carrier gas encounters the bubbling apparatus it creates the occurrence of bubbling within the $D_2O$ and allows for creation of the flowing, wet $D_2O$ atmosphere that is directed into the quartz tube structure or indiffusion chamber. Since $D_2O$ is relatively expensive, its use should be minimized. A few ccs should suffice for laboratory operations; more will be required in a commercial production facility. In one embodiment of the invention the flowing, wet $D_2O$ environment is created and sustained throughout the duration of the Ti-indiffusion process. It is also feasible and within the inventive concept herein disclosed to regulate and limit the flowing, wet $D_2O$ environment at various prescribed stages of the Ti-indiffusion process. Also note that the $D_2O$ may be recycled by passing the exhausted heavy wet oxygen through a refrigerator to freeze out the heavy water ($D_2O$). It can then be reliquified periodically and recycled. Since it is undesirable to introduce any $^1H$ atoms, care should be taken to avoid contamination of the $D_2O$ during the recycling process.

The Ti-indiffusion proceeds by raising the temperature (FIG. 4, reference number 130) to the appropriate level that affects the necessary degree of Ti-indiffusion desired. In general, the temperature can be raised to a value in the range of about 900 degrees Celsius to about 1100 degrees Celsius. A preferred indiffusion temperature of about 1050 degrees Celsius will generally allow for the occurrence of the requisite titanium indiffusion. The ramp up rate for elevating the temperature in the oven may be in the range of about 0.5 degrees Celsius per minute to about 20.0 degrees Celsius per minute. A presently preferred ramp up rate is about 10.0 degrees Celsius per minute.

The required duration of the indiffusion process will depend upon the thickness of the crystal substrate and the depth of the desired Ti-indiffusion. The indiffusion period (FIG. 4, reference number 132) is measured from the time at which the desired elevated temperature is reached. In general, the substrate will be held at elevated temperature for a period of time in a range of about 1 hour to about 5 hours with 3 to 4 hours being presently most preferred. The desired elevated temperature and elevated pressure should be maintained throughout this period of time.

The indiffusion process is completed by cooling the modulator build structure back down to approximately room temperature (FIG. 4, reference number 134). The ramp down rate for cooling the Ti-indiffusion environment may be in the range of about 0.5 degrees Celsius per minute to about 40.0 degrees Celsius per minute. A presently preferred ramp down rate is about 10.0 degrees Celsius per minute.

Figure 1E:
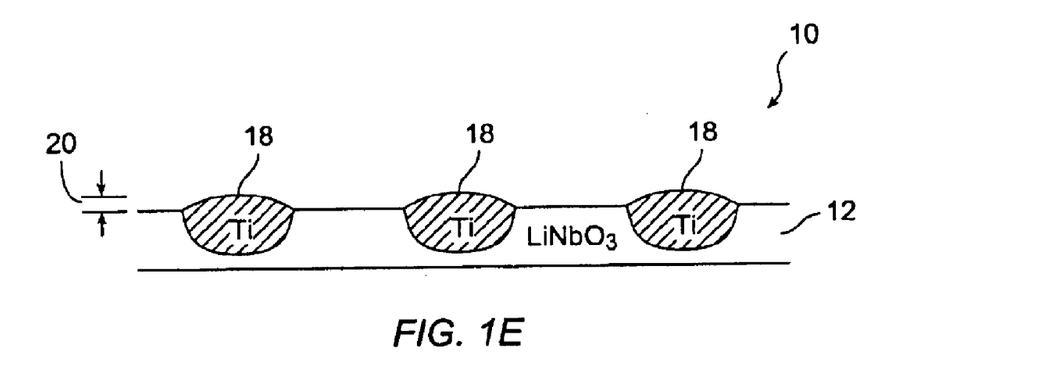

Referring again to the modulator build 10, FIG. 1E shows the modulator build 10 after completion of the TI-indiffusion process. Titanium has indiffused into the crystal lattice and created the diffusion region or waveguide region 18. Titanium atoms will disperse interstitially throughout the waveguide region 18 and in some instances, replace or niobium atoms in the crystal structure.

Figure 1F:
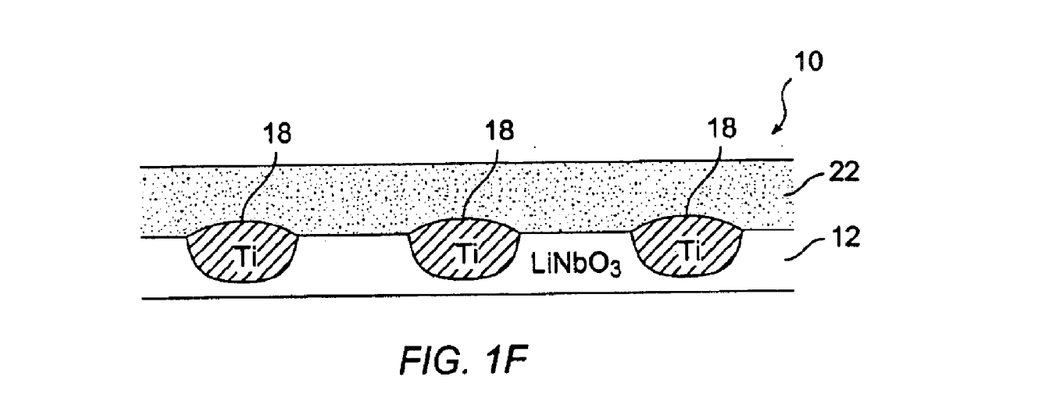

As shown in FIG. 1F, once the indiffusion process is completed a buffer layer 22 is placed over the entire-modulator build 10. Buffer layer 22 serves as insulation and is generally about 500 to about 10,000 angstroms in thickness, preferably about 3000 angstroms. Buffer layer 22 may comprise silicon oxide ($SiO_2$), silicon nitride ($Si_3N_4$ or other phases), a combination of silicon oxide and silicon nitride, indium tin oxide (ITO) or another suitable insulator material. A conventional deposition technique, such as sputtering, may be used to place buffer layer 22 over modulator build 10. It should be noted that the use of chemical vapor deposition (CVD) techniques should generally be avoided as such processing tends to generate undesirable free protons as discussed above with respect to wet etch processes.

Figure 1G:
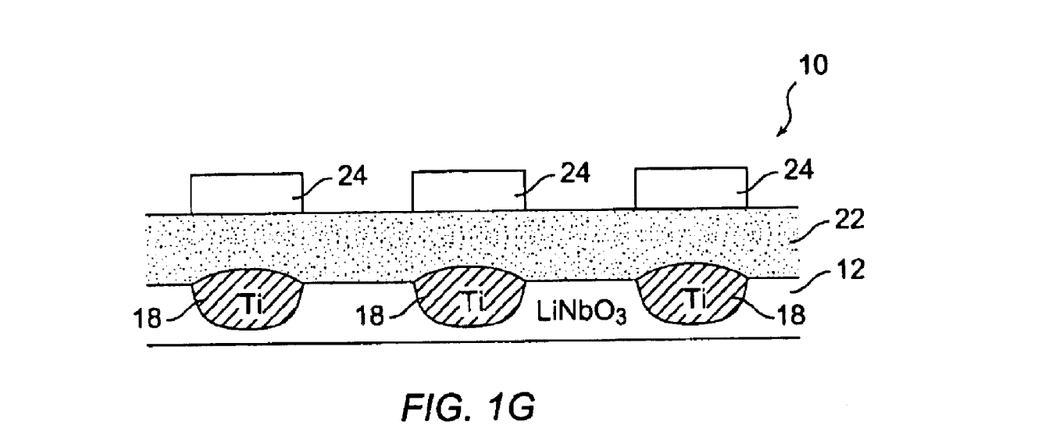

Referring to FIG. 1G, the modulator build 10 is completed by placing electrodes 24 above the buffer layer 22. As shown, electrodes 24 can be placed directly above waveguide regions 18 or they may be placed at other locations atop buffer layer 22. As is known by those of ordinary skill in the art, "Z" orientation modulators will have electrodes formed directly above the waveguides and "X" or "Y" orientation modulators will have electrodes formed offset from the waveguides. Standard deposition techniques are used to form electrodes 24 above buffer layer 22. A standard deposition technique may include a photoresist process, a conventional plasma deposition, sputtering or thermal evaporation process, a plasma etch process and a strip and acetone or propenyl wash process to eliminate the photoresist. The electrodes may be formed from gold (Au), chromium gold, titanium and gold or other suitable electrode materials. The use of chromium and titanium in combination with gold or as a pure thin layer between buffer layer 22 and electrode 24 is for the purpose of increasing adhesion between the gold and the buffer layer. The electrodes will typically be about 0.1 micron to about 4 microns in thickness.

Once the electrodes have been fabricated, the modulator build 10 undergoes a post build anneal process to relieve stress in the crystal, the electrodes and/or the buffer layer. In some instances, this anneal step may also be performed after the formation of buffer layer 22. This anneal process may be conducted in a flowing, wet $D_2O$ environment to eliminate the likelihood of free protons contaminating the modulator build. Lithium niobate has inherently high stress coefficients and relieving stress is essential to assure that output drift does not occur in the modulators. The preferred anneal temperature is about 300 degrees Celsius. Possible carrier gasses include oxygen, nitrogen, argon, helium, neon, or another gas essentially non-reactive with the substrate to flow into the bubbling apparatus 112 as described above. The flow rate of the carrier gas may preferably be within the range of 0.2 SCFH to about 5.0 SCFH with about 1.2 SCFH presently preferred as above. The preferred anneal duration is about 4 hours to about 6 hours.

FIG. 4 is a process flow diagram summarizing the method of the present invention. At reference number 124 titanium is deposited onto the substrate. At reference number 126 the carrier gas is wet with $D_2O$. At reference number 128 the carrier gas is flowed by the substrate. At reference number 130 the substrate is heated. At reference number 132 the titanium is indiffused into the substrate. At reference number 134 the substrate is cooled.

Alternative Embodiments

Although illustrative presently preferred embodiments and applications of this invention are shown and described herein, many variations and modifications are possible which remain within the concept, scope and spirit of the invention, and these variations would become clear to those skilled in the art after a perusal of this application. The invention, therefore, is not limited except in spirit of the appended claims.

What is claimed is:

1. A titanium indiffusion waveguide structure, comprising:

an electro-optic crystalline substrate;

a titanium indiffusion region extending beneath the surface of the substrate, said titanium indiffusion region having a crystalline structure; and deuterium disposed in said titanium indiffusion region.

2. A structure according to claim 1, further comprising:

a buffer layer formed of an insulator disposed over said crystalline substrate.

3. A structure according to claim 2, wherein said buffer layer includes one or more members of the group consisting of silicon nitride ($Si_3N_4$), Silicon dioxide ($SiO_2$), and Indium Tin Oxide (ITO).

4. A structure according to claim 2, further comprising an electrode disposed over said buffer layer.

5. A structure according to claim 4, wherein said electrode comprises gold.

6. A structure according to claim 3, further comprising:

a layer including chromium disposed over said buffer layer; and an electrode disposed over said chromium-containing layer, said electrode containing gold.

7. An optical modulator structure, comprising:

an electro-optic crystalline substrate;

at least a pair of titanium indiffusion regions extending beneath the surface of the substrate, said titanium indiffusion regions having a crystalline structure; and deuterium disposed in said titanium indiffusion regions, said titanium indiffusion regions being substantially free of free-flowing protons.

8. A structure according to claim 7, further comprising:

a buffer layer formed of an insulator disposed over said crystalline substrate.

9. A structure according to claim 8, wherein said buffer layer includes one or more members of the group consisting of:

silicon nitride ($Si_3N_4$), silicon dioxide ($SiO_2$) and Indium Tin Oxide (ITO).

10. A structure according to claim 8, further comprising electrodes disposed over said buffer layer.

11. A structure according to claim 10, wherein said electrodes comprise gold.

12. A structure according to claim 9, further comprising:

a layer including chromium disposed over said buffer layer; and electrodes disposed over said chromium-containing layer, said electrodes containing gold.

13. A method for fabricating a titanium-indiffusion waveguide, said method comprising:

disposing titanium in the desired form of the waveguide on the surface of an electro-optic crystalline substrate;

wetting a carrier gas with deuterium oxide ($D_2O$);

flowing the wet carrier gas through a container containing the substrate;

heating the substrate for a period of time to a temperature sufficient to cause the titanium to indiffuse into the substrate;

cooling the substrate down to about room temperature; and sustaining the wet $D_2O$ environment throughout the titanium indiffusion process.

14. A structure according to claim 1, wherein said titanium indiffusion region is substantially free of free-flowing protons.

15. A method for fabricating an optical modulator having at least two titanium indiffusion waveguides, said method comprising:

disposing a pair of titanium strips in the desired form of at least a pair of corresponding waveguides on the surface of an electro-optic crystalline substrate;

wetting a carrier gas with deuterium oxide ($D_2O$);

flowing the wet carrier gas through a container containing the substrate;

heating the substrate for a period of time to a temperature sufficient to cause the titanium to indiffuse into the substrate;

cooling the substrate down to about room temperature, the wet $D_2O$ environment being sustained throughout the titanium indiffusion process;

disposing a buffer layer over at least the titanium-indiffused portion of the substrate; and disposing electrodes on the buffer layer.

* * * * *

UNITED STATES PATENT AND TRADEMARK OFFICE
CERTIFICATE OF CORRECTION

PATENT NO. : 6,856,746 B2
DATED : February 15, 2005
INVENTOR(S) : Burrows et al.

It is certified that error appears in the above-identified patent and that said Letters Patent is hereby corrected as shown below:

Column 1,
Line 28, replace "STATES" with -- STATEMENT --.

Column 3,
Line 10, replace "diffusion" with -- diffusing --.

Column 5,
Line 28, replace "(RE)" with -- (RIE) --.

Column 6,
Line 11, delete "is".

Signed and Sealed this

Sixth Day of September, 2005

JON W. DUDAS
*Director of the United States Patent and Trademark Office*